United States Patent [19]

Alvarez

[11] Patent Number: 4,596,625
[45] Date of Patent: Jun. 24, 1986

[54] HEAT SEALING MACHINE FOR JOINING A BATTERY COVER AND BATTERY CASING

[76] Inventor: Oscar E. Alvarez, Apt. 701E, 5700 Mariner S., Tampa, Fla. 33609

[21] Appl. No.: 750,154

[22] Filed: Jul. 1, 1985

Related U.S. Application Data

[63] Continuation-in-part of Ser. No. 563,146, Dec. 13, 1983, Pat. No. 4,525,923.

[51] Int. Cl.⁴ .................. B23P 19/00; B29C 65/20
[52] U.S. Cl. .................... 156/499; 29/623.2; 29/730; 156/556; 156/583.1; 156/583.9
[58] Field of Search ............ 156/556, 499, 583.1, 156/583.8, 583.9; 29/730, 623.2

[56] References Cited

U.S. PATENT DOCUMENTS

| | | | |
|---|---|---|---|
| 1,932,136 | 10/1933 | Hole | 29/730 |
| 3,629,010 | 12/1971 | Hahn | 29/730 X |
| 3,883,369 | 5/1975 | Badger et al. | 156/499 |
| 4,221,626 | 9/1980 | Clay | 156/583.8 |
| 4,310,376 | 1/1982 | Ebina et al. | 156/499 |

Primary Examiner—Michael Wityshyn
Attorney, Agent, or Firm—Arthur W. Fisher, III

[57] ABSTRACT

A heat sealing machine for joining a battery casing and battery cover selectively operable in either a heating mode or a bonding mode comprising a battery casing station, a battery cover station and a battery casing/cover heater station operatively supported on a machine support frame, the battery casing station including a substantially horizontal support member to support the battery casing, the battery casing/cover heating station including a heater support frame movable between a first and second position pivotally mounted on the machine support frame having a casing/cover heater mounted on one end thereof and a counter balance mounted on the opposite end thereof, the battery cover station including a battery cover support frame movable between a first and second position pivotally mounted on the machine support frame having a battery cover support to support the battery cover pivotally attached to one end thereof and a counter balance mounted on the opposite end thereof, the machine support frame including a plurality of rollers for lateral movement of the individual battery casings thereon to move the battery casing laterally to the battery casing station, such that when the battery cover station and the battery casing/cover heater station are each in the second position the battery casing/cover heater station is operatively disposed between the battery casing and battery cover to heat the upper periphery of the battery casing and lower periphery of the battery cover and when the battery casing/cover heater station is in the first position and the battery cover station is in the second position the heated lower periphery of the battery cover engages the heated upper periphery of the battery casing to create a bond therebetween.

15 Claims, 5 Drawing Figures

FIG. 2
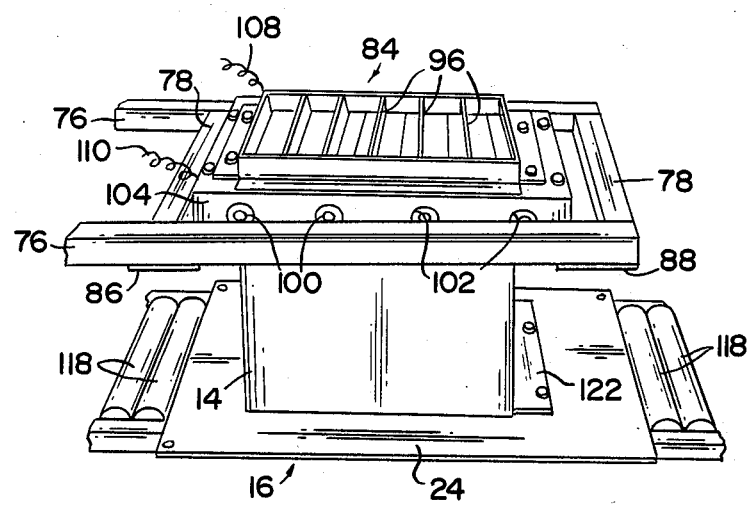
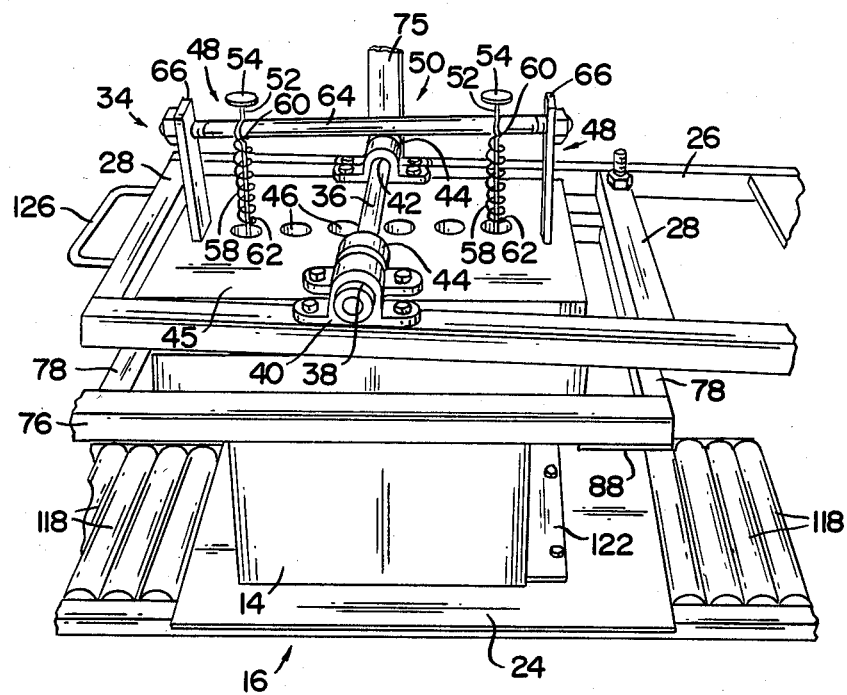
FIG. 3

HEAT SEALING MACHINE FOR JOINING A BATTERY COVER AND BATTERY CASING

CO-PENDING APPLICATIONS

The present application is a continuation-in-part of application, Ser. No. 563,146 filed on Dec. 13, 1983, now U.S. Pat. No. 4,525,923.

BACKGROUND OF THE INVENTION

1. Field of the Invention

A heat sealing machine for joining a battery casing and battery cover.

2. Description of the Prior Art

Various efforts have been made to secure battery covers to battery casings where such covers and casings are constructed of thermo-plastic material. The cover and casing are often joined together in a sealing manner by melting portions of the cover and the casing by heating the cover and casing and joining the melted portions together under pressure.

Unfortunately, in the case of batteries having the poles and connecting bars inserted beforehand and the electrode plates connected thereto, it is not possible to use the heating plate because of the complexity of the construction of the connectiong bars and electrode plates existing on the inner side of the cover. This necessitates bonding the cover and the casing together with an adhesive material. However, the liquid integrity of the bonded seams is poor, so the electrolyte is apt to flow into adjacent cells. Moreover, this method of assembly is relatively inefficient.

Examples of the prior art are found in U.S. Pat. Nos. 3,441,448, 3,556,862, 3,629,010, 3,778,314, 3,909,300, 4,010,537, 4,025,371, 4,071,661, 4,171,564, 4,306,355, and 4,375,127.

SUMMARY OF THE INVENTION

The present invention relates to a heat sealing machine for joining a battery cover to a battery casing including a battery casing station, a battery cover station and a battery casing/cover heating station operatively supported on a machine support frame.

The battery casing station includes a substantially horizontal support member to support the battery casing.

The battery casing/cover heater station comprises a heater support frame movable between a first and second position coupled to the machine support frame. A casing/cover heater pivotally coupled to the heater support frame comprises a plurality of heating elements within a heater plate. These heating elements are coupled to a temperature regulator to control the temperature thereof. In turn, the temperature regulator is coupled to an electric source.

The battery cover station comprises a battery cover support frame movable between a first and second position pivotally coupled to the machine support frame. A battery cover support is pivotally coupled to the battery cover support frame to support the battery cover thereof.

The machine support frame includes a plurality of rollers forming a roller conveyor disposed on opposite sides of the substantially horizontal support member to support the battery casing and permit lateral movement thereof to and from the battery casing station.

In operation, an open battery casing is located at the battery casing station by moving the battery casing laterally on the roller conveyor to engage a stop means. The battery casing/cover heater station is then rotated downwardly to engage the upper periphery of the battery casing. Since the heater plate is free floating within the heater support frame, the lower surface of the heater plate engages the periphery of the battery casing with equal pressure to evenly distribute the heat thereon.

The battery cover station is then rotated downwardly to engage the upper surface of the heater plate. Since the battery cover support is pivotally coupled to the battery cover support frame, the lower periphery of the battery cover engages the heater plate with equal pressure to evenly receive heat therefrom.

Once the open battery casing and battery cover are heated, both the battery cover station and battery casing/cover heater station are rotated to the first position. The battery cover station is then rotated to the second position to permit the lower periphery of the battery cover to engage the upper periphery of the battery casing. Thus, the bonding therebetween. Once the bond is accomplished, the battery cover support frame is returned to the first position to permit removal of the unitary battery cover and battery casing from the heat sealing machine.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 2 is a perspective view of the battery casing station and casing/cover heater with the battery casing/cover heater station in the second postion.

FIG. 3 is a perspective view of the battery casing station, casing/cover heater and battery cover support with both the battery casing/cover heater station and battery cover station in the second position.

Similar reference characters refer to similar arts throughout the several views of the drawings.

DETAILED DESCRIPTION OF THE PREFERRED EMBODIMENT

Figure 1:
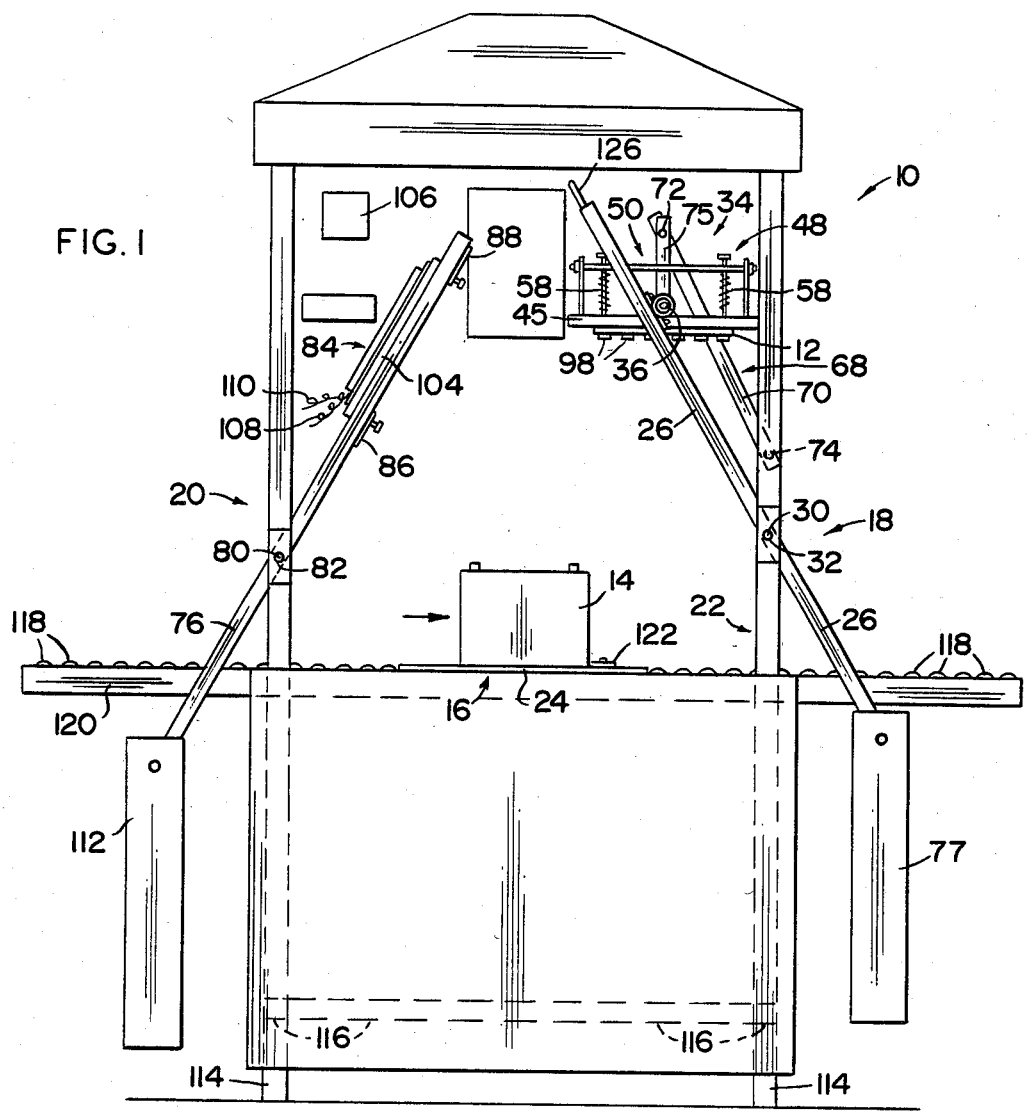
FIG. 1 is a front view of the heat sealing machine with both the battery casing/cover heating station and battery cover station in the first position.

As shown in FIG. 1 the present invention relates to a heat sealing machine generally indicated as 10 selectively operable in either a heating or bonding mode for sealing a battery cover 12 to a battery casing 14. The heat sealing machine 10 includes a battery casing station, a battery cover station and a battery casing/cover heater station generally indicated as 16, 18 and 20 respectively operatively supported on a machine support frame generally indicated as 22.

The battery casing station 16 comprises a flat substantially horizontal support member 24 mounted on the machine support frame 22 to support the battery casing 14.

Figure 4:
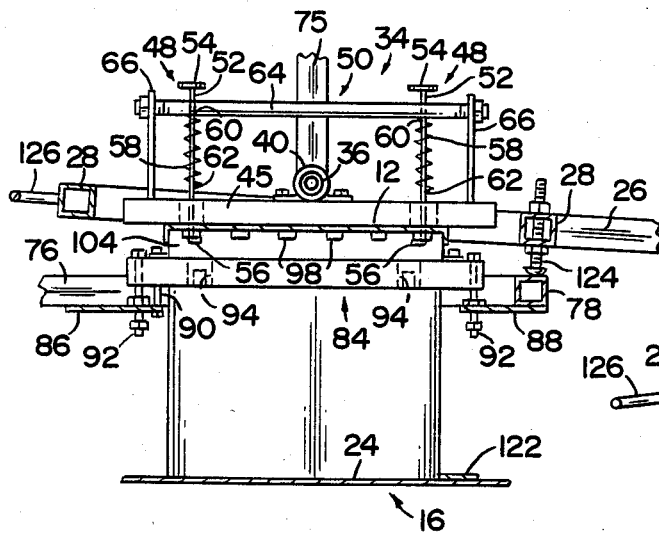
FIG. 4 is a front view of the battery casing station, casing/cover heater and battery cover support with both the battery casing/cover heater station and battery cover station in the second postion.

The battery cover station 18 comprises a substantially rectangular battery cover support frame including a pair of substantially parallel side members, each indicated as 26, held in fixed spaced relationship relative to each other by a plurality of substantially parallel cross members, each indicated as 28. The substantially rectangular battery cover support frame is pivotally coupled to the machine support frame 22 by an elongated pivot member 30 extending through channels or apertures 32 formed in the substantially parallel side members 26 and into a portion of the machine support frame 22. As best shown in FIG. 4, a battery cover support generally indicated as 34 is pivotally coupled between the substantially parallel side members 26 by an elongated pivot member 36 extending through apertures 38 formed in a pair mounting brackets each indicated as 40 on the substantially parallel side members 26 and through apertures 42 formed in a corresponding pair of mounting brackets each indicated as 44 formed on a battery cover support member 45. The battery cover support member 45 further includes a plurality of attachment channels each indicated as 46 to receive the lower portion of a plurality of battery cover attachments each indicated as 48 therethrough while the upper portion of each of the battery cover attachments 48 is coupled to an attachment frame generally indicated as 50. Each battery cover attachment 48 comprises a rigid elongated element 52 having an upper flat member 54 and a lower hook member 56 formed on opposite ends thereof and a spring or bias 58 including an upper hook member 60 and lower attachment member 62 in surrounding relationship relative to the rigid elongated element 52. The attachment frame 50 comprises substantially horizontal member 64 held in fixed spaced relationship relative to the battery cover support member 45 by a pair of substantially parallel upright members each indicated as 66. The battery cover attachments 48 extend vertically between the substantially horizontal member 64 and the lower surface of the battery cover support member 45 to secure the battery cover 12 to the battery cover support 34 as described more fully hereinafter.

As best shown is FIG. 1, the battery cover station 18 further including a battery cover support positioning means generally indicated as 68 coupled between the machine support frame 22 and the battery cover support frame to maintain the battery cover 12 in a horizontal disposition and in parallel relationship relative to the flat substantially horizontal support member 24 and the battery casing 14. The battery cover support positioning means 68 comprises an interconnecting arm indicated as 70 rotatably coupled between a pivot point 72 and 74 formed on a control arm 75 and machine frame support 22 respectively. The lower end of the control arm 75 is rotatably coupled to the elongated pivot member 36. The vertical distance between 72 and 36 and 74 and 30 is substantially equal. Coupled to the lower end of the battery cover support frame is at least one counter balance 77 rotatably mounted thereon to provide ease of operation.

The battery casing/cover heat station 20 comprises a substantially rectangular battery casing/cover heater support frame including a pair of substantially parallel side members, each indicated as 76, held in fixed spaced relationship relative to each other by a plutality of substantially parallel cross members each indicated as 78. The battery casing/cover heater support frame is pivotally coupled to the machine support frame 22 by an elongated pivot member 80 extending through channels or apertures 82 formed in the substantially parallel side members 76 and into a portion of the machine support frame 22. A casing/cover heater generally indicated as 84 is movably supported on an inner and outer heater support plate indicated as 86 and 88 respectively. A pair of adjustable spacers each indicated as 90 are coupled to the inner heater support plate 86, while a pair of fasteners each indicated as 92 movably couples the casing/cover heater 84 to the inner and outer heater support plate 88. A pair of terminal post receiving apertures each indicated as 94 are formed in the casing/cover heater 84 to receive the terminal post of the battery casing 14. In addition, a plurality of ribs each indicated as 96 are formed on the upper surface of the casing/cover heater 84 to receive the raised sides and ridges 98 formed on the lower surface of the battery cover 12. A plurality of heating elements each indicated as 100 are disposed within channels 102 in transfer relationship to a heater plate 104. The heating elements 100 are coupled to a temperature regulator 106 by conductors 108 and 110 for control thereof. In turn, the temperature regulator 106 is coupled to an electric source (not shown). Coupled to the lower end of the battery casing/cover heater support frame is at least one counter balance 112 rotably mounted thereon to provide ease of operation.

The machine support frame 22 comprises four substantially parallel upright members each generally indicated as 114 held in fixed space relation to each other by a plurality of substantially parallel horizontal cross members each indicated as 116. A plurality of rollers 118 cooperatively forming a roller conveyor are supported on a conveyor frame 120. A stop means 122 is provided to properly align the battery casing 14 at the battery casing station 16.

In operation an open battery casing 14 is located at the battery casing station 16 by moving the battery casing 14 laterally on the roller conveyor to engage the stop means 122. The battery casing/heater station 20 is then rotated from the first to second position to engage the upper periphery of the battery casing 14 as shown in FIG. 2. Since the heater plate 104 is free floating within the substantially rectangular battery casing/cover heater support frame, the lower surface of the heater plate 104 engages the periphery of the battery casing 14 with equal pressure to evenly distribute the heat thereon.

The battery cover station is then rotated from the first to second position as shown in FIGS. 3 and 4 to engage the upper surface of the heater plate 104. Since the battery cover support member 45 is piviotly coupled to the battery cover support frame and held in a substantially horizontal position by the battery cover positoning means, the lower periphery of the battery cover 12 engages the heater plate 104 with equal pressure to evenly receive heat therefrom. As shown in FIG. 4, an adjustable engagement element 124 is attached to the cross member 28 to engage cross member 78 to apply pressure to the battery casing/cover heater station 20 by depressing handle 126.

Figure 5:
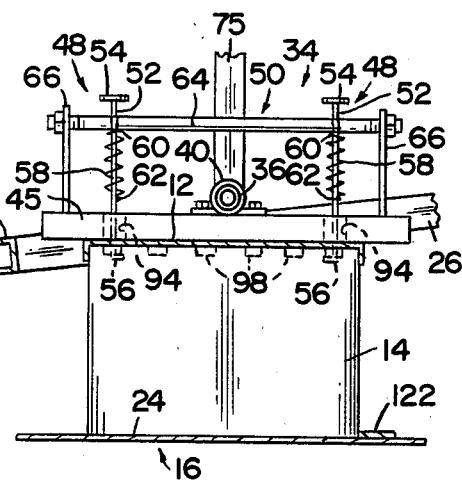
FIG. 5 is a front view of the battery casing station and battery cover support with the battery cover station in the second position.

Once the open battery casing 14 and battery cover 12 are heated, both the battery cover station 18 and battery casing/cover heater station 20 are rotated from the second to the first position. The battery cover station 18 is then returned to the second position as shown in FIG. 5 to permit the battery cover 12 to engage the upper periphery of the battery casing 14. Thus, the bonding therebetween. Once the bond is accomplished, the battery cover station 18 is rotated to the first position to permit removal of the unitary battery cover and battery casing from the heat sealing machine 10.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A heat sealing machine for joining a battery casing and battery cover selectively operable in either a heating mode or a bonding mode comprising a battery casing station, a battery cover station and a battery casing-/cover heater station operatively supported on a machine support frame, said battery casing station configured to support the battery casing, said battery casing-/cover heater station including a heater support frame movable between first and second positions pivotally mounted on said machine support frame having a casing/cover heater pivotally mounted on one end thereof, said battery cover station including a battery cover support frame movable between first and second positions pivotally mounted on said machine support frame having a battery cover support to support the battery cover pivotally attached to one end thereof such that when said battery cover station and said battery casing/cover heater station are each in said second positions said battery casing/cover heater station is operatively disposed between said battery casing and battery cover to heat the upper periphery of the battery casing and lower periphery of the battery cover and when said battery casing/cover heater station is in said first position and said battery cover station is in said second position the heated lower periphery of the battery cover engages the heated upper periphery of the battery casing to create a bond therebetween.

2. The heat sealing machine of claim 1 wherein said battery cover support comprises a battery cover support member operatively coupled to said battery cover support frame and a means to removably attach the battery cover to said battery cover support.

3. The heat sealing machine of claim 2 wherein said means to attach the battery cover to said battery cover support member comprises at least one battery cover attachment coupled to an attachment frame mounted on said battery cover support member, said battery cover attachment extending through an attachment channel formed in said battery cover support member to secure the battery cover to the lower surface thereof.

4. The heat sealing machine of claim 3 wherein said battery cover attachment comprises an elongated element having a upper flat member and a lower hook member formed on opposite ends thereof and a bias including an upper hook member to engage said attachment frame and a lower attachment member to secure said bias to the mid portion of said elongated element, said lower hook member being disposed to engage the undersurface of the battery cover.

5. The heat sealing machine of claim 4 wherein said attachment frame comprises a substantiallly horizontal member held in fixed spaced relationship relative to said battery cover support member by a pair of substantially upright members extending upwardly from said battery cover support member.

6. The heat sealing machine of claim 2 wherein said battery cover station further includes battery cover support positioning means coupled between said machine support frame and said battery cover support to maintain the battery cover mounted thereon in a substantially horizontal disposition.

7. The heat sealing machine of claim 6 wherein said battery cover support positioning means comprises an interconnecting arm rotatably coupled between said machine support frame and a control arm rotatably coupled to said battery cover support member.

8. The heat sealing machine of claim 1 wherein said battery cover station further includes a counter balance rotatably mounted on said battery cover support frame.

9. The heat sealing machine of claim 1 wherein the battery casing/cover heater station further includes inner and outer heater support plates formed on said heater support frame to operatively support said casing-/cover heater.

10. The heat sealing machine of claim 9 wherein said casing/cover heater is movably supported on said inner and outer heater support plates.

11. The heat sealing machine of claim 10 wherein said battery casing/cover heater station further includes at least one adjustable spacer operatively mounted on said inner heater support plate to control the vertical separation between said casing/cover heater and said inner heater support plate.

12. The heat sealing machine of claim 1 wherein said battery casing/cover heater station further includes a counter balance rotatably mounted on said battery casing/cover heater support frame.

13. The heat sealing machine of claim 1 wherein said machine support frame includes a plurality of rollers for lateral movement of the individual battery casings thereon to move the battery casing laterally to and from said battery casing station.

14. The heat sealing machine of claim 1 wherein said battery casing station comprises a substantially horizontal support member.

15. The heat sealing machine of claim 1 wherein said battery cover station further includes an engagement element formed thereon to engage said battery casing-/cover heater station when said battery casing/cover heater station and battery cover station are in said second position.

* * * * *